United States Patent [19]

Djelouah et al.

[11] Patent Number: 5,168,728
[45] Date of Patent: Dec. 8, 1992

[54] PROCESS OF COOLING AND DEHUMIDIFYING HOT, DAMP AIR AND THE INSTALLATION ENABLING THIS PROCESS TO BE PERFORMED

[75] Inventors: Salah Djelouah, Saint Denis de l'Hotel; Francis Forrat, Manosque, both of France

[73] Assignee: Sorelec, France

[21] Appl. No.: 453,642

[22] Filed: Dec. 20, 1989

[30] Foreign Application Priority Data

Dec. 22, 1988 [FR] France ............................. 88 16986

[51] Int. Cl.⁵ ............................................. B01D 9/04
[52] U.S. Cl. ............................................. 62/532; 62/87; 62/123; 62/235.1; 202/234; 203/10; 203/DIG. 1; 203/DIG. 20
[58] Field of Search ............ 62/86, 87, 93, 123, 62/235.1, 532; 202/234; 203/DIG. 1, DIG. 20, 10, 11

[56] References Cited

U.S. PATENT DOCUMENTS

| 244,601 | 7/1881 | Hill | 62/87 |
|---|---|---|---|
| 252,921 | 1/1882 | Allen | 62/87 |
| 263,620 | 8/1882 | Sturgeon | 62/87 |
| 1,004,468 | 9/1911 | Reynolds et al. | 62/88 |
| 1,103,440 | 7/1914 | Sellon | 62/87 |
| 1,264,807 | 8/1918 | Jefferies | 62/88 |
| 1,901,389 | 3/1933 | Flamand | 62/88 |
| 2,119,201 | 5/1938 | Cook et al. | 62/135 |
| 2,310,520 | 2/1943 | Pelterie | 62/6 |
| 2,458,894 | 1/1949 | Collins | 62/178 |
| 2,496,602 | 2/1950 | Schlichtig | 183/120 |
| 2,510,881 | 6/1950 | Gerteis | 62/115 |
| 2,767,560 | 10/1956 | Grey | 62/134 |
| 2,782,613 | 2/1957 | Addie | 62/136 |
| 2,856,758 | 10/1958 | Eggleston et al. | 62/88 |
| 3,091,097 | 5/1963 | Friant | 62/85 |
| 3,226,948 | 1/1966 | Alderson et al. | 62/317 |
| 3,289,436 | 12/1966 | Groves et al. | 62/402 |
| 3,314,244 | 4/1967 | Green | 62/88 |
| 3,587,243 | 6/1971 | Keller et al. | 62/87 |
| 3,623,332 | 11/1971 | Fernandes | 62/87 |
| 3,868,827 | 3/1975 | Lindhardt et al. | 62/63 |
| 3,878,692 | 4/1975 | Steves | 62/87 |
| 3,896,632 | 7/1975 | Huntley | 62/88 |
| 3,913,351 | 10/1975 | Edwards | 62/402 |
| 3,928,145 | 12/1975 | Othmer | 203/DIG. 20 |
| 4,015,438 | 4/1977 | Kinsell et al. | 62/88 |
| 4,178,766 | 12/1979 | Eskeli | 62/88 |
| 4,262,495 | 4/1981 | Gupta et al. | 62/402 |
| 4,283,916 | 8/1981 | Bassetti | 62/5 |
| 4,292,136 | 9/1981 | Clavier | 202/234 |
| 4,295,518 | 10/1981 | Rannenberg | 165/2 |
| 4,334,411 | 6/1982 | Payne | 62/86 |
| 4,374,469 | 2/1983 | Rannenberg | 62/402 |
| 4,420,944 | 12/1983 | Dibrell | 62/86 |
| 4,430,867 | 2/1984 | Warner | 62/402 |
| 4,444,024 | 4/1984 | McFee | 62/401 |
| 4,493,195 | 1/1985 | Zalesak et al. | 62/402 |
| 4,539,816 | 9/1985 | Fox | 62/87 |
| 4,550,578 | 11/1985 | Rannenberg | 62/172 |
| 4,553,407 | 11/1985 | Rannenberg | 62/402 |
| 4,716,737 | 1/1988 | Mandrin | 62/87 |
| 4,771,612 | 9/1988 | Kurikka | 62/402 |

FOREIGN PATENT DOCUMENTS

0596511 3/1978 Switzerland .

*Primary Examiner*—Ronald C. Capossela
*Attorney, Agent, or Firm*—Seidel, Gonda, Lavorgna & Monaco

[57] ABSTRACT

A process and installation for producing cooled air and water or energy and water from hot damp air. In the former embodiment, the hot damp air is first compressed. Then, the compressed air is at least partially dehumidified and cooled. The dehumidified, cooled, compressed air is thereafter expanded. In the latter embodiment, the hot damp air is first expanded. The expanded air is thereafter compressed. In addition to the above, the invention also has utility in desalinating salt water.

11 Claims, 1 Drawing Sheet

PROCESS OF COOLING AND DEHUMIDIFYING HOT, DAMP AIR AND THE INSTALLATION ENABLING THIS PROCESS TO BE PERFORMED

The present invention relates to a process and installation for cooling and dehumidifying hot damp air, intended in particular for air conditioning systems in humid tropical climates and enabling cool, dry air and distilled water to be supplied.

The temperature and humidity conditions prevailing in tropical countries pose very particular problems for their inhabitants, connected with the desire, for reasons of comfort, of developing air conditioning installations, both domestic and large-scale, and above all with the requirement to overcome the crucial problem of water shortages which is catastrophic for some races. The only means of resolving this problem appears to be the desalination of sea-water.

Air conditioning apparatus are generally based on cooling by contact in an exchanger cooled by a refrigerating assembly; this technique, which is perfectly satisfactory in temperate countries, is unfortunately difficult to adapt to a large scale in tropical countries in view of the expensive and fragile nature of these installations. It should further be noted that they are not competetive with other systems such as multi-purpose evaporation for the desalination of sea-water.

A process is known in particular (CH-596 511), the sole aim of which is to dry the air intended more particularly for air conditioning installations. In the technique described in this document, dried air is obtained, the temperature of which at the outlet of the installation is greater than the inlet temperature, this result being the opposite of the cooling sought-after by the present invention. This document also allows for the use of two turbines instead of a single one and an exchanger using the same air conditioning air in both circuits, which has the disadvantage of leading to too high an outlet temperature requiring an additional conventional cooling system, as is openly stated. The excessive cost of a double installation of this type is not acceptable from the economic point of view. It should also be noted that the inventor of the process has not realised that a water separator was essential in front of the first turbine. In addition, this patent states that "all the energy released by the two turbines is theoretically greater than that absorbed by the compressor", which is contrary to the second principle of thermodynamics, this error being confirmed, moreover, by the need of regulation in order to prevent the machine reaching too high a velocity.

The object of the present invention is to provide a process and an installation for cooling and dehumidifying hot damp air intended in particular for conditioning the air in humid tropical climates and enabling cool dry air and distilled water to be provided whilst converting the heat from the condensation of the steam during the expansion to be converted into mechanical energy.

One aim of the invention is to propose a process and installation for cooling hot air, more particularly intended for tropical countries, which can easily be used in individual air conditioning installations, namely which is comparatively basic, i.e. not expensive, and at the same time of the type able to dehumidify the ambient air which always has a high degree of humidity at these latitudes.

To this end, the invention relates to a process of the above type, characterised in that the air is compressed and expanded with the production of dehumidified air, condensed water and expansion energy increased by some of the energy from the condensation of the water.

More specifically, the hot damp air is compressed, partially dehumidified then subjected to an essentially adiabatic expansion process.

This definition of the invention likewise covers the reverse order of the operations, i.e. the expansion of the air followed by dehumidification and compression. Condensed water is obtained in both cases. This enables the driving effort of the expansion process increased by the energy contributed by the condensation of the water in the expansion apparatus to be recovered. This driving energy may be recovered in a turbine, or more generally, in a motor-regulator and decreases the energy to be supplied during the compression stage by the corresponding amount.

In general, the process and installation according to the invention enable either cold air and water to be produced by compression and expansion, or energy and water by expansion then compression.

Generally, the present invention enables numerous applications to be implemented, such as the production of cold air and water by compression, cooling and dehumidifying, then expansion of the fluid or else the production of energy and water by expansion then separation of the liquid and compression of the dried air, for example.

The process according to the invention is implemented in principle on the basis of the well known fact that the saturation point of air varies according to the temperature or, in other words, that at saturation point, the water vapour content of hot air is much greater than that of cold air. Indeed air at 90° C. may contain approximately 400 g of water vapour per cubic meter whilst this value drops to approximately 32 g/m$^3$ at 35° C. and 5 g/m$^3$ at 4° C.

Consequently, if air which is extremely humid and previously compressed is expanded under substantially adiabatic conditions, the result of the reduction in pressure is a sharp decrease in the temperature (the equation representing the adiabatic conditions PV=Cte is to be combined with the equation representing the state of the ideal gases: PV=RT) and thus, for the above-mentioned reasons, results in a substantial decrease in the degree of humidity in the air.

It is evident that the process described above may advantageously be used to provide air conditioning installations which are particularly simple and hardy.

A further advantage of this process is connected with the exothermic nature of the expansion reaction and, in particular, of the water vapour condensation reaction: the energy returned by condensing a mass of one kilogram of water vapour is in effect of the order of 700 Wh. Consequently, if air is originally processed at a temperature of 35° C., saturated to 90%, i.e. containing 32 g/m$^3$ of water vapour, in a manner such that its temperature is lowered to 4° C., the air at saturation point can now contain no more than 5 g water vapour per cubic meter; this means that for a theoretical yield of 100%, 27 g of water should be liquefied per cubic meter of air, during the process, and thus produce energy equal to 18.9 Wh per cubic meter of air.

In reality, it is of course impossible to perform the expansion operation in completely adiabatic conditions and, therefore, the yield is never 100%; the amount of energy recovered is, however, still considerable and may advantageously be used during the compression phase, according to another feature of the invention.

Taking account of the above, it is evident that the aforementioned process enables, on the one hand, air which is cool and relatively dry and, on the other, water which has been subjected to a distillation process and thus of a high degree of purity, to be obtained simultaneously and in a simple manner.

In accordance with the invention, it has quite naturally been considered to use this possibility of obtaining cool and pure water on a larger scale in order to develop a process for desalinating water.

To this end, and in accordance with a preferred feature of the invention, before the air is compressed it is treated in a preliminary stage by being heated, in particular by solar energy and saturating it with water vapour by evaporating salt water from the sea or lagoons.

The profitability of this process is in fact linked to the efficiency of this preliminary heating process: as has already been stated, air heated to 90° C. may contain up to approximately 400 g of water per cubic meter at normal atmospheric pressure.

The invention likewise relates to an installation enabling the above-mentioned process to be performed.

In accordance with the invention, the main component of this installation is a turbo-compressor or turbo-regulator which processes the hot damp air directly by compressing and expanding it.

In order to enable it to compress the initial hot damp air, the turbo-compressor is driven by an electric motor, which may be fed by a mains supply or by a photocell, enabling it to be more autonomous. A useful, if not essential, component for obtaining low temperatures is an air-to-air exchanger designed to cool compressed air before it is injected into the turbine.

Designed in this way, it is evident that the installation according to the invention is extremely simple and may be used in a particularly advantageous manner for air conditioning in tropical homes, whether on a domestic or on a larger scale.

When it is desired to obtain pure water from salt water simultaneously with this air conditioning process, the temperature of the initial air must be artificially raised in order to increase its humidity content following the evaporation of salt water.

For this purpose, and in accordance with a further feature of the invention, the installation comprises a hot house device enabling the sun to heat the water to be desalinated.

According to a further feature of the invention, the surface of the water to be evaporated can be covered with a black grating in order to improve evaporation.

A further possibility which can be used to increase the temperature of the initial air consists in using a solar water heater which operates in particular by concentration.

In all cases, drops of water carried by the air can if necessary advantageously be recovered using a water droplet separating device.

The energy consumption of the installation is still clearly reduced by using expansion force increased by the energy from the condensation of the water during the compression stage. It is to be noted that, for saturated humid air temperatures greater than 90° C., the installation may be autonomous from the energy point of view. The electric motor driving the compressor does not use any further energy and may even operate as an alternator and produce electrical energy if the initial temperature of the air exceeds 95° C. In this case, the turbo-compressor is a steam machine using the dual air/water vapour mixture.

The features of the process and of the installation which are the subject matter of the invention will be described in greater detail with reference to the attached drawings, wherein.

Figure 1:
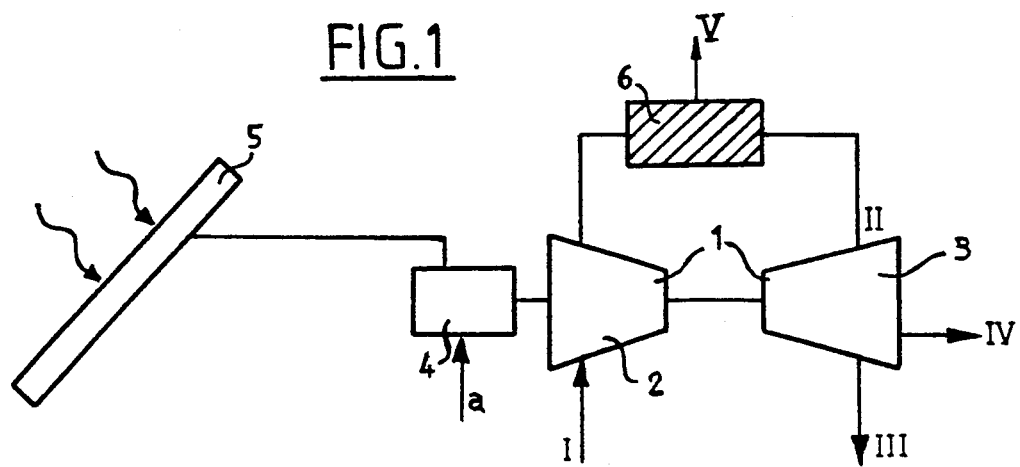
FIG. 1 is a diagram of the installation used as an air conditioner.

In accordance with FIG. 1, the main component of the installation consists of a turbo-compressor 1 or turbo-regulator divided into a compressor 2, which compresses the initial air, and a turbine or expansion device 3 which expands it. The compressor 2 is driven by an electric motor 4 which, in accordance with the Figure, is fed by a photocell 5 but may also be connected to a mains supply; an air-to-air exchanger 6 lowers the temperature of the compressed air.

According to the Figure, the initial hot damp air is drawn in as shown by the arrow I by the compressor then the compressed air II is cooled at V and arrives in the turbine 3 in which it is subjected to an adiabatic expansion process and then emerges therefrom, as shown by arrow III, at its outlet pressure; during this stage, a large proportion of the water initially contained in the air is condensed and may be recovered, as shown by arrow IV. The energy released during this expansion and condensation stage is returned, as shown by the arrow a, to the drive motor 4, for the compressor 2, and reduces the electricity consumption thereof.

Figure 2:
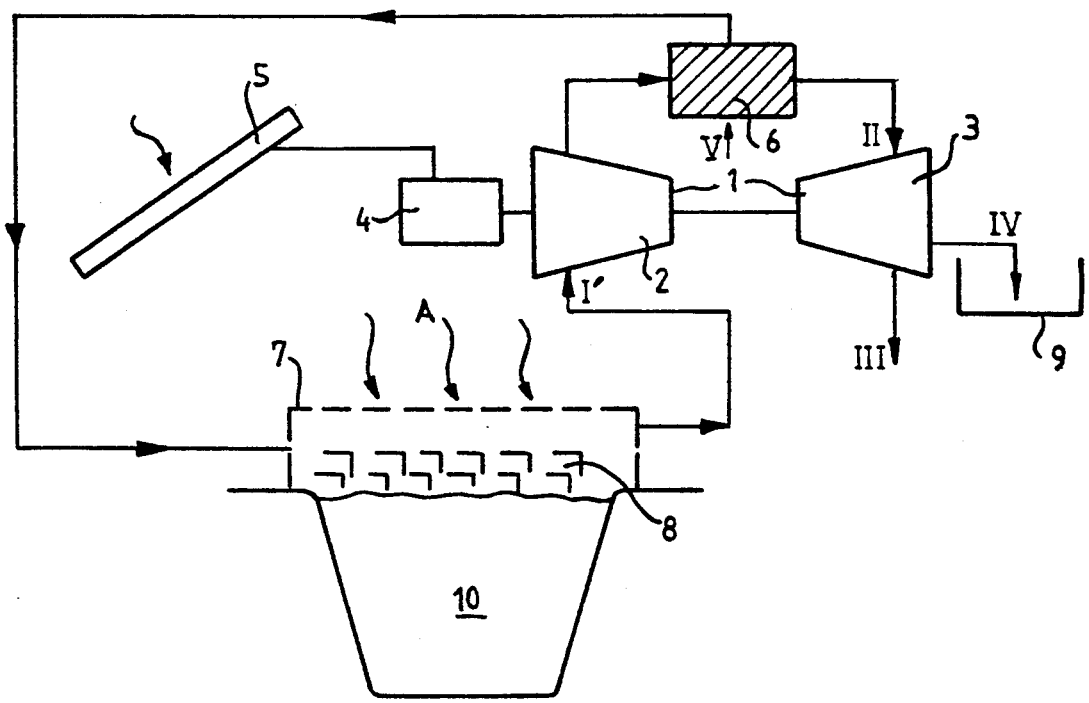
FIG. 2 is a diagram of the installation used for desalination.

In accordance with FIG. 2, there is associated with the above-mentioned air conditioning installation, a salt water reservoir 10 which is heated by the rays of the sun A using a hot house device 7; the evaporation is improved owing to the addition of an immersed black grating 8 covering the surface of the water.

In a similar manner to the installation described above, the air heated at the hot house device 7 arriving as shown by arrow I' is drawn in by the compressor 2 then the compressed air cooled at V reaches the turbine 3 where it is subjected to adiabatic expansion and is then discharged according to arrow III; at the same time, the distilled water is recovered in a reservoir 9 as shown by arrow IV.

It is evident that the installation which is the subject of the invention may be used:

in its first version for air conditioning in homes in hot and humid regions on a domestic or mass scale; by drying the air it makes it more comfortable;

in its second version to desalinate water from the sea or lagoons in hot regions, likewise on a domestic or mass scale; it produces pure water.

We claim:

1. A process for cooling and dehumidifying hot damp air, said process comprises:
   (a) heating said hot damp air;
   (b) saturating said heated air with water;
   (c) compressing said water-saturated air during a compression stage;
   (d) at least partially dehumidifying and cooling said compressed air; and
   (e) rapidly expanding said at least partially dehumidified, cooled, compressed air during an expansion phase, to produce:
      i. condensed water, and ii. air having a temperature and water vapor concentration in grams of water per kilogram of dry air less than that of said hot damp air.

2. A process as claimed in claim 1, wherein mechanical energy is also produced during said expansion phase, and wherein said mechanical energy is used to at least partially compress said hot damp air during said compression stage.

3. A process as claimed in claim 1, wherein solar energy provides at least some of the heat used in step (a).

4. An installation for performing the process as claimed in claim 1, wherein said installation comprises a compressor, a motor-regulator, an air-to-air exchanger and a water separator.

5. An installation as claimed in claim 4, wherein said installation comprises at least one heat exchanger located between said compressor and said motor regulator.

6. An installation as claimed in claim 4, wherein said installation comprises at least one solar water heater for heating and saturating said hot damp air in steps (a) and (b) of the process recited in claim 1.

7. An installation as claimed in claim 6, wherein said installation comprises a black grating immersed on the surface of the water used for saturating the heated air.

8. An installation as claimed in claim 4, wherein said installation comprises a water droplet separator enabling the drops of water carried by said air to be recovered after said expansion phase.

9. A process for cooling and dehumidifying hot damp air, said process comprises:
   (a) obtaining an apparatus comprising a compressor, a motor-regulator, an air-to-air exchanger and a water droplet separator;
   (b) using said compressor to compress said hot damp air during a compression stage;
   (c) at least partially dehumidifying and cooling said compressed air;
   (d) using said motor-regulator to rapidly expand said at least partially dehumidified, cooled, compressed air during an expansion phase, to produce:
   i. water, and
   ii. air having a temperature and water vapor concentration in grams of water per kilogram of dry air less than that of said hot damp air; and
   (e) using said water droplet separator to recover water produced during said expansion phase.

10. A process as recited in claim 9 wherein, prior to said compression stage, said hot damp air is heated and saturated with water.

11. A process as recited in claim 9 wherein, prior to said compression stage, said process further comprises increasing the humidity of said hot damp air.

* * * * *